July 7, 1936.  J. E. MOOSE  2,046,526

WAXLIKE DIELECTRIC COMPOSITION

Filed Oct. 28, 1932

INVENTOR

Joe E. Moose

BY

Herbert J Chase.

ATTORNEY

Patented July 7, 1936

2,046,526

UNITED STATES PATENT OFFICE 2,046,526

WAXLIKE DIELECTRIC COMPOSITION

Joe E. Moose, Anniston, Ala., assignor to Swann Research, Incorporated, a corporation of Alabama Application October 28, 1932, Serial No. 640,021

5 Claims. (Cl. 106—17)

This invention relates to electrical apparatus, particularly to that class of apparatus wherein an insulating compound is interposed between two or more conducting elements, charged, during operation, to an electrical difference of potential. Examples of such apparatus are condensers, lightning arresters, coils, potheads, etc.

This invention is particularly adaptable to the manufacture of condensers; however, it should be understood that it is not without considerable advantage when applied to other apparatus of the class described.

Electrical condensers are commonly made by winding two continuous sheets of metal foil and two or more separating sheets of insulating paper on a mandrel until the area of foil is sufficient to give the required electrical capacity. Such a structure may then be pressed flat, after removal of the mandrel, and then impregnated with a dielectric material in order to exclude moisture and prevent breakdown.

Figure 1:
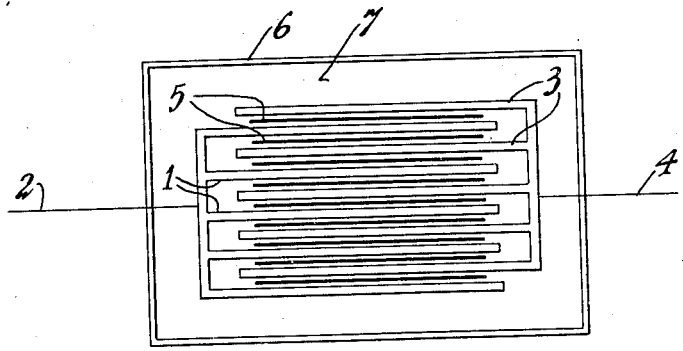
Figure 2:
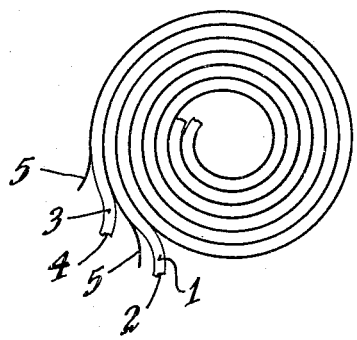

Reference is made to the accompanying drawing, Figures 1 and 2 of which show in diagrammatic form an electrical condenser embodying one form of my invention. In Figure 1 numerals 1 and 3 represent a plurality of sheets of metallic foil connected respectively to leads 2 and 4. Sheets of insulating paper 5 are interposed between the sheets of metallic foil 1 and 3, and are impregnated with a mixture of tri and tetra chlor toluene. Numeral 6 represents a container, usually constructed of sheet metal and enclosing the structure and also the space 7. Within space 7 is poured a molten mixture of the tri and tetra chlor toluenes effectively sealing the contained structure from atmospheric moisture.

Figure 2 illustrates an electrical condenser in a form in which they are commonly made. In this figure numerals 1 and 3 represent sheets of metallic foil, while numeral 5 represents sheets of insulating material, as paper, interposed between the foil sheets. Electrical conductors 2 and 4 enable a connection to be made with the foil sheets 1 and 3.

I have now discovered that if such a structure be impregnated with a solid tri or tetra chlortoluene or a mixture of these materials, an improved condenser is obtained. A condenser thus impregnated will have a considerably higher electrical capacitance than one impregnated with mineral oil, and increased efficiency in service.

If no increase in capacitance is desired, a smaller condenser may be impregnated according to my invention and the capacity thereof increased.

It is, therefore, apparent that one useful result of my invention is the fact that it enables condensers to be made materially smaller in size than hitherto, without sacrificing the condenser life. Further advantages reside in the fact that such a condenser is particularly suitable for fairly high operating temperatures, and furthermore that it will not absorb moisture from the atmosphere.

The chlorinated toluenes which I employ in my improved condenser are those in which the chlorine has been substituted in the aromatic ring rather than in the side chain. Since non-crystalline solids of high vapor pressure are desired, the tri or tetrachlor toluenes are preferred altho higher as well as lower chlorinated bodies may be employed if desired. A method of manufacturing chlorinated toluenes suitable for incorporation as an insulating and impregnating material in condensers is given in the following example:—

Example

Chlorinate toluene by passing chlorine into the liquid, in the presence of a chlorination catalyst such as iron, until the toluene has combined with between three and four atoms of chlorine per molecule. During chlorination the temperature of the reacting mass is maintained as low as possible, consistent with a fairly rapid absorption of chlorine. For example, the temperature may be maintained in the neighborhood of 40° C. during the first part of the reaction, after which the temperature is permitted to rise as the mass becomes more viscous in order to maintain sufficient fluidity to permit chlorine absorption. The final temperature may be in the neighborhood of 80° C.

After chlorination the mass is washed with water, which may be hot if the presence of a side chain chlorination product is suspected, in order to hydrolyze such products and to remove hydrochloric acid and iron chlorides. The washed product is then dried and distilled.

During distillation the following fractions may be obtained by making cuts at the appropriate points:—

1. Boiling range 240–252° C., freezing range 36.5–35.3° C.
2. Boiling range 252–265° C., freezing range 68.0–53° C.
3. Boiling range 265–278° C., freezing range 95.0–92° C.
4. Boiling range 278–280° C., freezing range 126–105° C.
5. Boiling range 280–292° C., freezing range 156–132° C.

The freezing range for the various fractions are also given and enable one to select the proper material for particular use. All of the above-mentioned fractions are solid and wax-like materials at room temperature, exhibiting a dielectric constant in the neighborhood of 3.93 to 4.00, a power factor in the range of 0.41 to 0.46, and resistivity of 200 to $500 \times 10^9$ ohms per centimeter$^3$.

If a lower power factor is desired, further purification may be effected by melting the material, stirring in attapulgus or infusorial earth for 30 minutes, and then filtering the purified chlortoluenes. Purified in this manner the product is suitable for direct impregnation into condensers, and will show an improved power factor.

The chlortoluenes which I employ for my improved condenser are characterized by a very soft wax-like crystalline structure which is obtained by cooling the material slowly from above the melting point. The improvement in condensers which I obtain by impregnation with such wax-like chlortoluenes results from the novel combination of properties exhibited by the solid chlortoluenes herein described. These properties as at present understood comprise the combination of electrical properties and the wax-like structure of such softness as to render failure of the paper dielectric by mechanical straining of the condenser assembly during operation with rapidly alternating currents practically impossible.

Other properties of the tri and tetra chlortoluenes which result in an improved condenser result from the fact that they are chemically inert as regards the electrode and insulating materials commonly employed in electrical devices of the class here considered, they readily penetrate dielectrics such as condenser paper and they can be produced as members of a series of solids having melting points varying from 35 C. to 135° C.

Further modification of the impregnating agent may be made by incorporating with chlortoluenes various other waxes and resins such as paraffin wax, gilsonite, chlorinated naphthalene, chlorinated diphenyl, sulphur, etc. The chlortoluenes herein described are preferably incorporated in major proportion with the materials above mentioned.

Condensers such as are herein described may in some cases be sealed into containers in order to protect them from damage during handling, etc. For such purpose the solid chlortoluenes may be employed as the sealing composition, or they may be combined with any of the several materials mentioned above, or other of a like nature and thus utilized.

Having now described only a single embodiment of my invention, it will be apparent to those skilled in the art that it is not so limited, but that it is susceptible of various changes and modifications without departing from the spirit thereof, and I desire that only such limitations shall be placed thereupon as may be imposed by the prior art, or as are specifically set forth in the appended claims.

What I claim is:—

1. A dielectric medium for an electrical device consisting of a solid wax-like mixture of tri- and tetra-chlor-toluenes having a soft crystalline structure produced by slowly cooling the mixture from above the melting point.

2. A dielectric medium for an electrical device consisting of a soft wax-like mixture of tri- and tetra-chlor-toluenes having a boiling range between 240° C. and 290° C., and having a freezing range between 35.3° C. and 132° C., and exhibiting a dielectric constant in the neighborhood of 4.00.

3. A dielectric medium for an electrical device consisting of a soft wax-like mixture of tri- and tetra-chlor-toluenes having a boiling range between 240° C. and 290° C., a dielectric constant in the neighborhood of 4.00, and being substantially free from side-chain chlorination products.

4. A dielectric medium for an electrical device consisting of a soft wax-like mixture of tri- and tetra-chlor-toluenes having a distilling range between 240° C. and 290° C., and having a resistivity of from 200 to $500 \times 10^9$ ohms per cubic centimeter.

5. A dielectric medium for an electrical device consisting of a soft wax-like mixture of tri- and tetra-chlor-toluenes distilling between 240° C. and 290° C., and modified by the incorporation therewith of waxes and resins selected from the group consisting of paraffin wax, gilsonite, chlorinated diphenyl, chlorinated naphthalene, sulfur.

JOE E. MOOSE.